(12) United States Patent
Mednik

(10) Patent No.: US 8,896,219 B1
(45) Date of Patent: Nov. 25, 2014

(54) DIMMING CIRCUIT AND METHOD

(71) Applicant: Alexander Mednik, Campbell, CA (US)

(72) Inventor: Alexander Mednik, Campbell, CA (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 14/049,984

(22) Filed: Oct. 9, 2013

(51) Int. Cl.
  *H05B 37/00* (2006.01)
  *H05B 39/00* (2006.01)
  *H05B 41/00* (2006.01)
  *H05B 33/08* (2006.01)
(52) U.S. Cl.
  CPC .................................. *H05B 33/0815* (2013.01)
  USPC ........ 315/186; 315/193; 315/240; 315/241 R; 315/310

(58) Field of Classification Search
  None
  See application file for complete search history.

(56) References Cited

U.S. PATENT DOCUMENTS

2010/0225290 A1* 9/2010 Nalbant ..................... 323/282
2013/0076245 A1* 3/2013 Phadke ..................... 315/121

* cited by examiner

*Primary Examiner* — Anh Tran
(74) *Attorney, Agent, or Firm* — Weiss & Moy, P.C.; Jeffrey D. Moy

(57) ABSTRACT

A Light Emitting Diode (LED) driver circuit for driving an LED string has a switch-mode power supply coupled to the LED string. A control circuit is provided and has a first terminal coupled to a pulse width modulated input and a second terminal coupled to the switch mode power supply. A disconnect switch is coupled to a third terminal of the control circuit and the LED string.

15 Claims, 3 Drawing Sheets

DIMMING CIRCUIT AND METHOD

RELATED APPLICATIONS

The present application is related to U.S. Provisional Application entitled, "DIMMING CIRCUIT AND METHOD", Filed Oct. 12, 2012, and having U.S. Ser. No. 61/713,312 in the name of the same inventor. The present patent application claims the benefit under 35 U.S.C. §119(e).

TECHNICAL FIELD

This invention relates generally to an electronic circuit and, more specifically to a capacitive parametric zero crossing detection circuit and a semiconductor device for application as a capacitive parametric zero crossing detector device.

BACKGROUND

Recent developments of high-brightness light emitting diodes (LED) have opened new horizons in lighting. Highly efficient and reliable LED lighting continuously wins recognition in various areas of general lighting, especially in areas where cost of maintenance is a concern. LEDs are being adopted in a wide variety of electronics applications, for example, architectural lighting, automotive head and tail lights, backlights for liquid crystal display devices including personal computers and high definition TVs, flashlights, etc. Compared to conventional lighting sources such as incandescent lamps and fluorescent lamps, LEDs have significant advantages, including high efficiency, good directionality, color stability, high reliability, long life time, small size, and environmental safety Referring to FIG. 1, a prior art LED driver 10 of a boost type is shown. The LED driver 10 may have a positive input voltage source $+V_{IN}$, an input filter capacitor 110, a boost inductor 111, a controlled switch 113, a rectifier diode 112, and an output capacitor 114. In the embodiment shown in FIG. 1, the LED driver 10 may be coupled to a positive input voltage source $+V_{IN}$. The input filter capacitor 110 may have a first terminal coupled to the positive input voltage source $+V_{IN}$ and a second terminal coupled to ground. The boost inductor 111 may have a first terminal coupled to the positive input voltage source $+V_{IN}$ and the first terminal of the input filter capacitor 110. A controlled switch 113 may have a first terminal coupled to the second terminal of the boost inductor 111, a second terminal for receiving a control signal, and a third terminal coupled to ground. The rectifier diode 112 may have a first terminal coupled to the first terminal of the controlled switch 112 and the second terminal of the boost inductor 111. The output capacitor 114 has a first terminal coupled to a second terminal of the rectifier diode 112 and to a first terminal of the LED load 200 and a second terminal coupled to ground. The load switch has a first terminal coupled to the second terminal of the LED load 200, a second terminal coupled to a control signal, and a third terminal coupled to ground. While the above LED driver 10 does function, the LED driver 10 has a limitation of the LED load 200 not been wired to ground directly, which is required for many applications.

Therefore, it would be desirable to provide a circuit and method that overcome the above problem.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

A Light Emitting Diode (LED) driver circuit for driving an LED string has a switch-mode power supply coupled to the LED string. A control circuit has a first terminal coupled to a pulse width modulated input and a second terminal coupled to the switch mode power supply. A disconnect switch is coupled to a third terminal of the control circuit and the LED string. An output filter capacitor has a first terminal coupled to the LED string and the switch mode power supply and a second terminal coupled to the disconnect switch.

A Light Emitting Diode (LED) driver circuit for driving an LED string has a switch-mode power supply coupled to the LED string. A control circuit has a first terminal coupled to a pulse width modulated input and a second terminal coupled to the switch mode power supply. A disconnect switch is coupled to a third terminal of the control circuit and the LED string. An output filter capacitor has a first terminal coupled to the LED string and the switch mode power supply and a second terminal coupled to the disconnect switch. The switch-mode power supply has an input voltage source. An inductor has a first terminal coupled to the input voltage source. A controlled switch has a first terminal coupled to the second terminal of the inductor, a second terminal for receiving a control signal, and a third terminal coupled to ground. A rectifier diode has a first terminal coupled to the first terminal of the controlled switch and the second terminal of the inductor and a second terminal coupled to the LED string.

A Light Emitting Diode (LED) driver circuit for driving an LED string has a switch-mode power supply coupled to the LED string. A control circuit has a first terminal coupled to a pulse width modulated input and a second terminal coupled to the switch mode power supply. A disconnect switch is coupled to a third terminal of the control circuit and the LED string. An output filter capacitor has a first terminal coupled to the LED string and the switch mode power supply and a second terminal coupled to the disconnect switch. The switch-mode power supply has an input voltage source. A first inductor has a first terminal coupled to the input voltage source. A controlled switch has a first terminal coupled to the second terminal of the first inductor, a second terminal for receiving a control signal, and a third terminal coupled to ground. A coupling capacitor has a first terminal coupled to the first terminal of the controlled switch and a second terminal of the first inductor and a second terminal coupled to the control circuit. A rectifier diode has a first terminal coupled to the first terminal of the second terminal of the coupling capacitor and the control circuit, an output inductor has a first terminal coupled to the first terminal of the rectifier diode, a second terminal of the second terminal of the coupling capacitor and the control circuit and a second terminal coupled to ground.

A Light Emitting Diode (LED) driver circuit for driving an LED string has a switch-mode power supply coupled to the LED string. A control circuit has a first terminal coupled to a pulse width modulated input and a second terminal coupled to the switch mode power supply. A disconnect switch is coupled to a third terminal of the control circuit and the LED string. An output filter capacitor has a first terminal coupled to the LED string and the switch mode power supply and a second terminal coupled to the disconnect switch. The switch-mode power supply has an input voltage source. A controlled switch has a first terminal coupled to the control circuit, a second terminal coupled to a control signal and a third terminal coupled to the input voltage source. An inductor has a first terminal coupled to the first terminal of the controlled switch and the control circuit and a second terminal coupled to ground. A rectifier diode has a first terminal coupled to the first terminal of the inductor, the first terminal of the controlled switch and the control circuit and a second terminal coupled to the LED string.

A Light Emitting Diode (LED) driver circuit for driving an LED string has a switch-mode power supply coupled to the LED string. A control circuit has a first terminal coupled to a pulse width modulated input and a second terminal coupled to the switch mode power supply. A disconnect switch is coupled to a third terminal of the control circuit and the LED string. An output filter capacitor has a first terminal coupled to the LED string and the switch mode power supply and a second terminal coupled to the disconnect switch. The control circuit delays switching of the disconnect switch until an approximately zero-current condition is detected by the control circuit.

The features, functions, and advantages may be achieved independently in various embodiments of the disclosure or may be combined in yet other embodiments.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
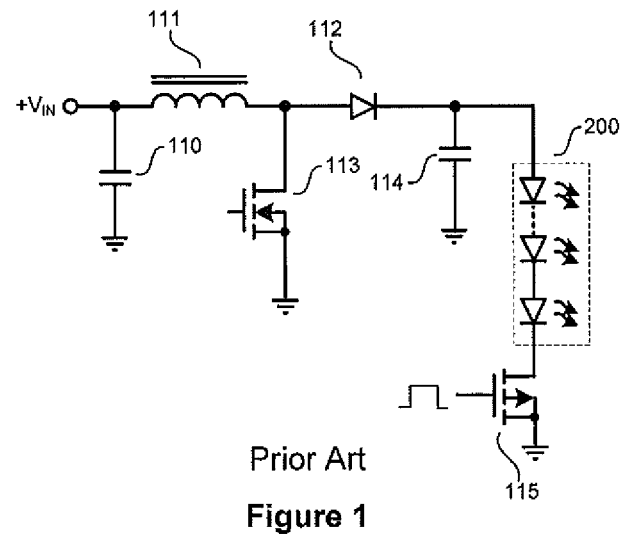
FIG. 1 is a schematic diagram illustrating a prior art LED driver of a boost type.
Figure 2:
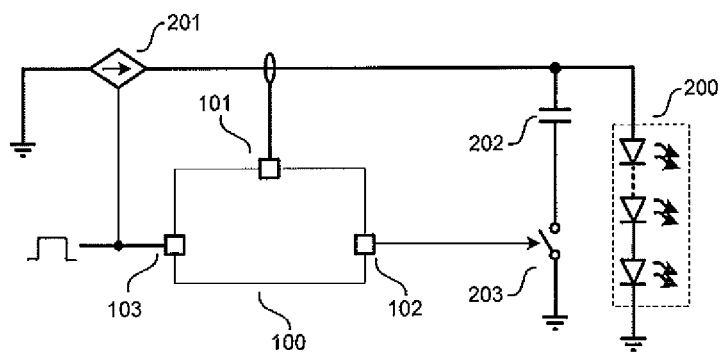
FIG. 2 is a schematic diagram illustrating an LED driver of the present invention.

Referring to FIG. 2, an LED driver circuit of the present invention is shown. The LED driver circuit may be comprised of a switch-mode power supply 201, a control circuit 100, an output filter capacitor 202, and a disconnect switch 203 for powering the LED string 200. The switch-mode power supply 201 may be used to deliver controlled average current to the LED load 200 repeatedly at a controlled duty ratio to achieve dimming of the LED load 200. The output filter capacitor 202 may be used for bypassing switching ripple component of the power supply 201 output current. The disconnect switch 203 may be used for disconnecting the capacitor 202 from the LED load 200 repeatedly at a controlled duty ratio delayed with respect to the turn-off transitions of the switch-mode power supply 201 to allow its residual current to be absorbed by the capacitor 202. The control circuit 100 may have a pulse-width modulated, or PWM, input 103, a delayed PWM output 102, and a zero-current detector input 101 for deactivating the disconnect switch 203 when substantially zero current is detected in the power supply 201 by the zero detector input 101.

Figure 3:
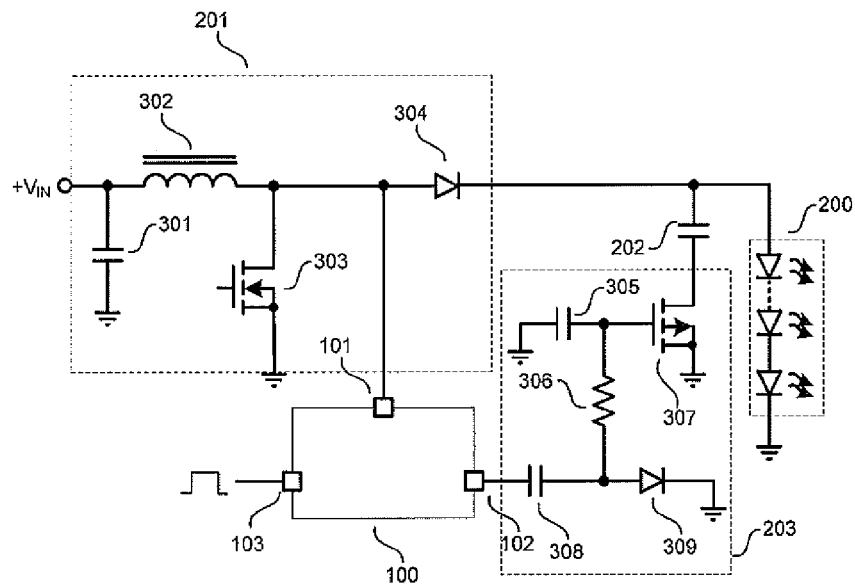
FIG. 3 is a schematic diagram illustrating the LED driver of FIG. 2 showing the circuitry of the power supply and disconnect switch.

Referring now to FIG. 3, the LED driver of FIG. 2 is shown where the switch-mode power supply 201 is of the boost type. In the embodiment shown in FIG. 3, the switch-mode power supply 201 may be comprised of a positive input voltage source +$V_{IN}$, an input filter capacitor 301, a boost inductor 302, a controlled switch 303, and a rectifier diode 304. The switch-mode power supply 201 has a positive input voltage source +$V_{IN}$. The input filter capacitor 301 may have a first terminal coupled to the positive input voltage source +$V_{IN}$ and a second terminal coupled to ground. The boost inductor 302 may have a first terminal coupled to the positive input voltage source +$V_{IN}$ and the first terminal of the input filter capacitor 301. The controlled switch 303 may have a first terminal coupled to the second terminal of the boost inductor 302, a second terminal for receiving a control signal, and a third terminal coupled to ground. The rectifier diode 304 may have a first terminal coupled to the first terminal of the controlled switch 303 and the second terminal of the boost inductor 111.

In the present embodiment, the disconnect switch 203 may be comprised a P-channel MOSFET 307, a charge-pump capacitor 308, a charge pump diode 309, a filter resistor 306, and a filter capacitor 305. The capacitor 305 can be represented by the intrinsic input capacitance of the P-channel MOSFET 307. The P-channel MOSFET 307 may have a first terminal coupled to a second terminal of the capacitor 202 and a third terminal coupled to ground. The capacitor 305 has a first terminal coupled to a second terminal of the P-channel MOSFET 307 and to a first terminal of the filter resistor 306 and a second terminal coupled to ground. The charge-pump capacitor 308 has a first terminal coupled to the control circuit 100 and a second terminal coupled to a second terminal of the filter resistor 306. The charge pump diode 309 has a first terminal coupled to the second terminals of the charge-pump capacitor 308 and the filter resistor and a second terminal coupled to ground.

In operation, the control circuit 100 supplies high-frequency carrier signal at its output 102 to drive the charge pump consisting of capacitor 308 and diode 309. The resulting negative high-frequency carrier signal is filtered by the low-pass filter consisting of resistor 306 and capacitor 305, which filter derives a low-frequency PWM or DC negative potential for maintaining the MOSFET 307 in conduction. The charge pump is controlled by the output 102 at a low frequency PWM rate of the input 103, with the turn-off edge of 103 delayed until post-conduction voltage ringing is detected at the drain of the switch 303 by the input 101 reflecting a zero-current condition in the inductor 302.

Figure 4:
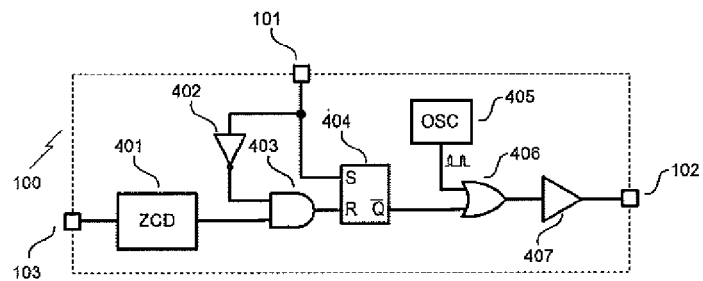
FIG. 4 is a schematic diagram illustrating one implementation of a control circuit used in the LED driver of FIG. 3.

Referring now to FIG. 4, one implementation of the control circuit 100 of FIG. 3 is shown. The control circuit 100 may be comprised a zero-current detector 401, a gate 403, an inverter 402, an RS latch 404, a high-frequency oscillator circuit 405, a modulator gate 406, and a charge pump driver 407. The zero-current detector 401 is coupled to terminal 103 of the control circuit 100. The gate 403 has a first input coupled to an output of the inverter 402 and a second input coupled to the output of the zero-current detector 401. The output of the gate 403 is coupled to the R input of the RS latch 404. The S input of the RS latch 404 is coupled to the input of the inverter 402 and the terminal 101 of the control circuit 100. The $\overline{Q}$ output of the RS latch 404 is coupled to a second input of the modulator gate 406. A first input of the modulator gate 406 is coupled to the high-frequency oscillator circuit 405. The output of the modulator gate 406 is coupled to the input of the charge pump driver 407. The output of the charge pump driver 407 is coupled to the terminal 102 of the control circuit 100.

Figure 5:
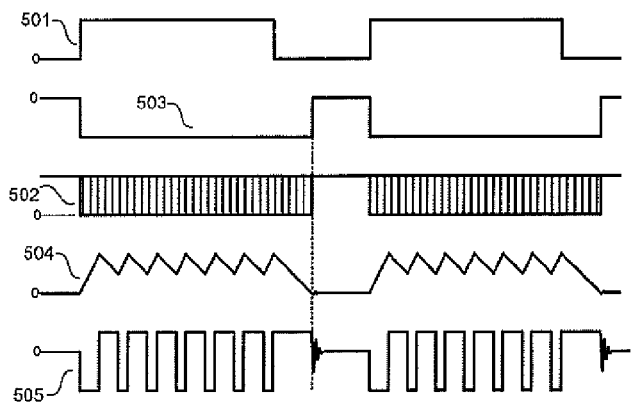
FIG. 5 demonstrates the waveforms seen in the circuit of FIG. 3 when using the control circuit 100 from FIG. 4.

Referring now to FIG. 5, waveforms showing operation of the circuit of FIG. 3 when using the control circuit 100 from FIG. 4 are shown. Waveform 501 can represents the low frequency PWM signal at the input 101. Waveform 504 can represents the inductor 302 current. The waveform 505 can be the voltage at the drain of the switch 303. Waveform 502 can be the signal at the output 102, showing the high-frequency carrier signal modulated at low-frequency PWM rate. The waveform 503 can be the gate signal of the MOSFET 307. In operation, the falling edge of the drain voltage 505 following the trailing edge of the signal 501 indicates the zero-crossing of the current 504. When this falling edge is detected by the input 101, the output 102 deactivates the disconnect switch 307.

Figure 6:
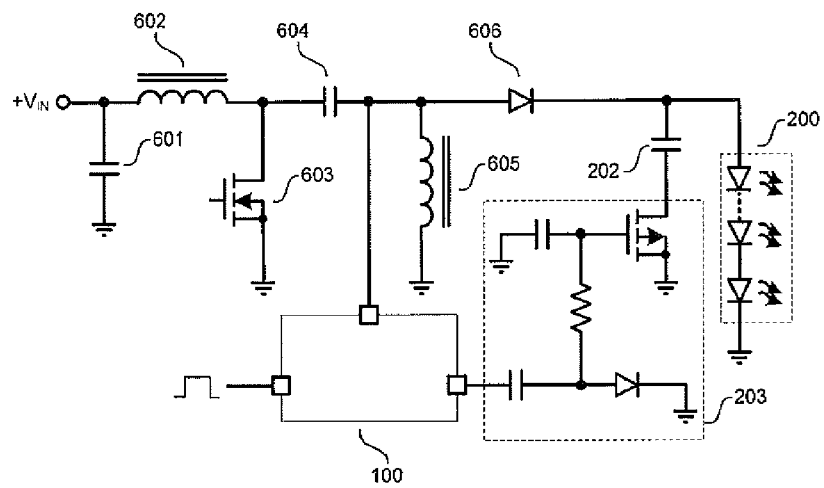
FIG. 6 depicts an LED driver of FIG. 2 where the switch-mode power supply is of the SEM type.

Referring now to FIG. 6, the LED driver of FIG. 2 is shown wherein the switch-mode power supply 201 is of the SEPIC type. In this embodiment, the switch-mode power supply may comprise a positive input voltage source $+V_{IN}$, an input filter capacitor 601, an input inductor 602, a controlled switch 603, a coupling capacitor 604, and output inductor 605, and a rectifier diode 606.

The switch-mode power supply has a positive input voltage source $+V_{IN}$. The input filter capacitor 601 may have a first terminal coupled to the positive input voltage source $+V_{IN}$ and a second terminal coupled to ground. The boost inductor 602 may have a first terminal coupled to the positive input voltage source $+V_{IN}$ and the first terminal of the input filter capacitor 601. The controlled switch 603 may have a first terminal coupled to the second terminal of the boost inductor 602, a second terminal for receiving a control signal, and a third terminal coupled to ground. The coupling capacitor 604 has a first terminal coupled to the first terminal of the controlled switch 603 and a second terminal of the boost inductor 602 and a second terminal coupled to the control circuit 100. The rectifier diode 606 may have a first terminal coupled to the first terminal of the second terminal of the coupling capacitor 604 and the control circuit 100. The output inductor 605 has a first terminal coupled to the first terminal of the rectifier diode, a second terminal of the second terminal of the coupling capacitor 604 and the control circuit 100 and a second terminal coupled to ground. The disconnect switch 203 may be the same as the one of FIG. 3 and the control circuit 100 may be the same as shown in FIG. 4.

Figure 7:
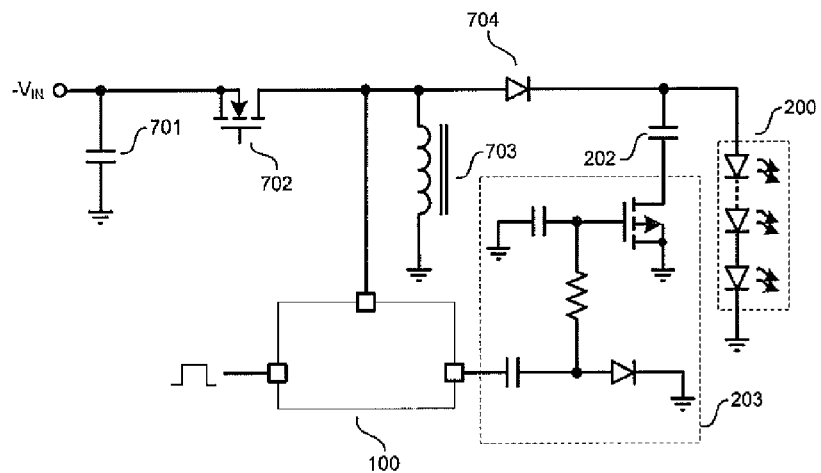
FIG. 7 depicts an LED driver of FIG. 2 where the switch-mode power supply 201 is of the buck-boost type.

Referring now to FIG. 7, the LED driver of FIG. 2 is shown where the switch-mode power supply 201 is of the buck-boost type. In the embodiment depicted in FIG. 7, the switch-mode power supply 201 may be comprised of a negative input voltage source $-V_{IN}$, an input filter capacitor 701, a controlled switch 702, a buck-boost inductor 703, and a rectifier diode 704.

The filter capacitor 701 may have a first terminal coupled to the negative input voltage source $-V_{IN}$ and a second terminal coupled to ground. The controlled switch 702 may have a first terminal coupled to the control circuit 100, a second terminal coupled to a control signal and a third terminal coupled to the first terminal of the filter capacitor and the negative input voltage source $-V_{IN}$. The buck-boost inductor 703 may have a first terminal coupled to the first terminal of the controlled switch 702 and the control circuit 100 and a second terminal coupled to ground. The rectifier diode 704 may have a first terminal coupled to the first terminal of the buck-boost inductor 703, the first terminal of the controlled switch 702 and the control circuit 100 and a second terminal coupled to the LED string 200. The disconnect switch 203 may be the same as the one of FIG. 3 and the control circuit 100 may be the same as shown in FIG. 4.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A Light Emitting Diode (LED) driver circuit for driving an LED string comprising:
   an input voltage source;
   a switch-mode power supply for supplying regulated current to the LED string, the switch-mode power supply having a first terminal coupled to the input voltage source, a second terminal coupled to the LED string, and a third terminal coupled to a pulse width modulated input adapted to enable and to disable the switch-mode power supply repetitively at a low frequency rate;
   a zero current detector for detecting output current of the switch-mode power supply becoming substantially zero, the zero current detector coupled to the second terminal of the switch-mode power supply;
   a control circuit having a first terminal coupled to the pulse width modulated input and a second terminal coupled to the zero current detector;
   a disconnect switch coupled to a third terminal of the control circuit and the LED string; and
   an output filter capacitor having a first terminal coupled to the LED string and the switch mode power supply and a second terminal coupled to the disconnect switch.

2. The LED driver circuit of claim 1, wherein the zero current detector is coupled to the first terminal of the switch mode power supply.

3. The LED driver circuit of claim 1, wherein:
the control circuit is adapted to enable and to disable the disconnect switch in response to the pulse width modulated input;
the disconnect switch is enabled by the control circuit upon receiving the pulse width modulated input;
the disconnect switch is disabled upon the zero current detector detecting substantially zero output current of the switch-mode power supply.

4. The LED driver circuit of claim 1, wherein the switch-mode power supply is a Single-Ended Primary-Inductor Converter (SEPIC) switch-mode power supply.

5. The LED driver circuit of claim 1, wherein the switch-mode power supply is a buck-boost type switch-mode power supply.

6. The LED driver circuit of claim 1, wherein the switch-mode power supply is a boost type switch-mode power supply.

7. The LED driver circuit of claim 1, wherein the switch-mode power supply is comprising an inductor having a second terminal coupled to the LED string and the first terminal of the output filter capacitor.

8. The LED driver circuit of claim 7, wherein the zero current detector is a voltage comparator detecting post-conduction voltage oscillation at the second terminal of the inductor.

9. The LED driver circuit of claim 7, wherein the zero current detector is a voltage comparator detecting a substantially zero-voltage at the second terminal of the inductor.

10. The LED driver circuit of claim 4, wherein the switch-mode power supply is comprising a second inductor having a terminal coupled to the LED string and the first terminal of the output filter capacitor, and wherein the zero current detector is coupled to the terminal of the second inductor.

11. The LED driver circuit of claim 1, wherein the control circuit comprises a latch having a set input coupled to the second terminal of the control circuit, a reset input coupled to the first terminal of the control circuit and an output signal coupled to the third terminal of the control circuit.

12. The LED driver circuit of claim 11, wherein the control circuit further comprises
an enable gate having a first input coupled to the first terminal of the control circuit, a second input coupled to the second terminal of the control circuit, and an output coupled to the reset input of the latch.

13. LED driver circuit of claim 12, wherein the control circuit further comprises an inverter gate having an input coupled to the first terminal of the control circuit and an output coupled to first input of the enable gate.

14. The LED driver circuit of claim 1, wherein the disconnect switch comprises:
a p-channel field-effect transistor having a drain terminal coupled to the LED string and a source terminal coupled to ground;
a capacitor having a first terminal coupled to a gate terminal of the transistor and a second terminal coupled to ground;
a filter resistor having a first terminal coupled to the gate terminal of the transistor and the second terminal of the capacitor;
a charge-pump capacitor having a first terminal coupled to the control circuit and a second terminal coupled to a second terminal of the filter resistor;
a charge pump diode having a first terminal coupled to the second terminals of the charge-pump capacitor and the filter resistor and a second terminal coupled to ground.

15. The LED driver circuit of claim 14, wherein the disconnect switch is further comprising:
a charge pump oscillator generating a high-frequency clock signal;
a charge pump driver having an input and an output, the output of the charge pump driver coupled to the first terminal of the charge-pump capacitor;
an modulator gate having a first input coupled the third terminal of the control circuit, a second input coupled to the charge pump oscillator, and an output coupled to the input of the charge-pump driver.

\* \* \* \* \*